United States Patent Office 3,270,013
Patented August 30, 1966

3,270,013
1-PHENYLAMINO-ANTHRAQUINONE
COMPOUNDS
Peter Hindermann, Bottmingen, Basel-Land, and Hans Peter Kolliker, Munchenstein, Basel-Land, Switzerland, assignors to J. R. Geigy A.-G., Basel, Switzerland
No Drawing. Division of application Ser. No. 164,414, Jan. 4, 1962. Continuation of application Ser. No. 446,457, Mar. 12, 1965. This application Oct. 18, 1965, Ser. No. 497,495
Claims priority, application Switzerland, Jan. 5, 1961, 93/61, 94/61
6 Claims. (Cl. 260—247.1)

This application is a divisional application of our pending application Serial No. 164,414, filed January 4, 1962, and a continuation application of the divisional application thereof, Serial No. 446,457, filed March 12, 1965, now abandoned.

The present invention concerns vicinally substituted 1-phenylamino-anthraquinone compounds, processes for the production thereof, their use for the dyeing of polyester fibers as well as, as industrial product, the polyester material dyed by the use of these anthraquinone compounds.

More in particular, the invention involves 1-phenylaminoanthraquinone compounds of the Formula I

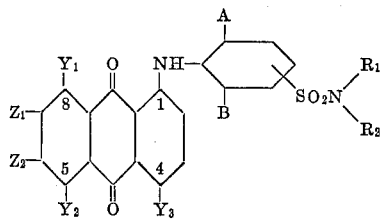

These compounds are obtained by reacting an anthraquinone compound of the general Formula II

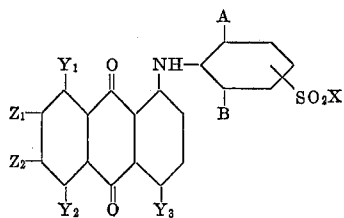

with an amine of the general Formula III

In the Formulas I, II and III

A represents a lower alkyl or alkoxy group,
B represents a lower alkyl or alkoxy group or halogen, it being possible for the phenylamino radical in the 1-position of the anthraquinone to be further substituted,
Each of $Y_1$ and $Y_2$ independently represents hydrogen, hydroxyl, amino or alkylamino groups and one of $Y_1$ and $Y_2$ also represents the nitro group provided the other as well as $Y_3$ are hydroxyl groups,
$Y_3$ represents hydrogen or the hydroxyl, amino, or alkylamino group,
Each of $Z_1$ and $Z_2$ represents hydrogen or halogen, either $Y_1$ and $Y_2$ or $Z_1$ and $Z_2$ being hydrogen,
X represents a mobile substituent which can be replaced by amino radicals, particularly halogen or radicals of acid aromatic hydroxyl compounds, and
Each of $R_1$ and $R_2$ independently represents hydrogen, a lower, possibly further substituted alkyl group or $R_1$ and $R_2$ together with the nitrogen also represent a piperidino or morpholino group.

Particularly valuable dyestuffs correspond to the Formula IV

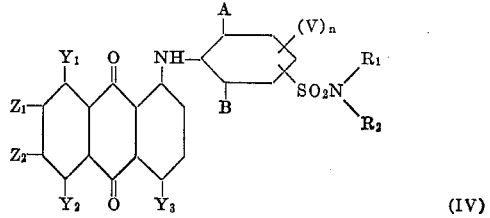

wherein

A is lower alkoxy, especially —$OCH_3$ or lower alkyl, especially alkyl having one to three carbon atoms,
B is lower alkoxy, halogen or lower alkyl (—$OCH_3$, Cl or alkyl containing one to three carbon atoms being particularly advantageous),
Each of $Y_1$ and $Y_2$ independently is —H, —OH, —$NH_2$, —$NHCH_3$ or —$NO_2$, $Y_3$ is —OH, —$NH_2$ or —$NHCH_3$,
Each of $Z_1$ and $Z_2$ independently is —H, or halogen, especially Cl,
V is lower alkoxy especially —$OCH_3$ or lower alkyl especially alkyl having one to three carbon atoms,
Each of $R_1$ and $R_2$ independently is hydrogen, lower alkyl, lower hydroxyalkyl or lower alkoxyalkyl (hydrogen, alkyl radicals having from one to four carbon atoms, β-hydroxyethyl, β-methoxyethyl or γ-methoxypropyl, being particularly advantageous), or
$R_1$ and $R_2$ taken together with the corresponding nitrogen atom are piperidino or morpholino and
n is one of the numerals 0 to 2 inclusive, with the limitations in the above structural formula that (1) only one of $Y_1$ and $Y_2$ can be an —$NH_2$, —$NHCH_3$ or —$NO_2$ and when this is the case, then $Y_3$ and the other of $Y_1$ and $Y_2$ both must be —OH and (2) at least both $Y_1$ and $Y_2$ or both $Z_1$ and $Z_2$ must be hydrogens.

In addition, dyestuffs of the above Formula IV wherein $Z_1$ and $Z_2$ are hydrogen, $Y_1$ and $Y_2$ are hydrogen or one Y is —OH and the other Y is —$NH_2$, $Y_3$ is —OH, A and B are lower alkyl radicals especially methyl, V, $R_1$ and $R_2$ are methyl and n is 0 or 1, are preferred.

Insofar as X in the Formula II is halogen, compounds of Formula IV which are used as starting materials are obtained from the corresponding 1-phenylaminoanthraquinones, the phenyl nucleus of which can be sulphonated, by reacting with a halogen sulphonic acid, preferably chlorosulphonic acid, or by sulphonating and treating the sulphonic acid with a halogenating agent such as a phosphoric acid halide, e.g. phosphorus oxytrichloride, or phosphorus pentachloride. Compounds of Formula II wherein X is the radical of an acid aromatic hydroxyl compound are obtained, for example, by reaction of the acid chloride of the one component with the alkali metal salt of the other component.

1-phenylaminoanthraquinones having a phenyl nucleus which can be sulphonated which are suitable for the production of starting materials usable according to the invention of the general Formula II are obtained, for example, by condensation of 1 mol of 2,6-dimethyl-, 2,6-diethyl-, 2,6-dimethoxy-, 2-methyl-6-ethyl-, 2-methyl-6-chloro-, 2,4,6-trimethyl-, 2,4,6-triethyl-, 2,3,5,6-tetramethyl-, 2,3,6-trimethoxy-, 2,6-dimethoxy-4-methyl- or 2,3-dimethoxy-6-methyl-1-aminobenzene with 1 mol of 1,4-dihydroxy-, 1,4,5-trihydroxy-, 1,4,5,8-tetrahydroxy-, 1,4-dihydroxy-6-chloro-, 1,4-dihydroxy-6,7-dichloro-, 1,5-dinitro-4,8-dihydroxy-, 1,8-dinitro-4,5-dihydroxy-, 1-nitro- 8-amino-4,5-dihydroxy- or 1-nitro-5-amino-4,8-dihydroxy-anthraquinone.

An advantageous process for the production of these condensation products using boric acid esters of 1,3-diols has been described above.

The anthraquinone compound is reacted with the amine at raised temperatures, advantageously at about 40–180° C. The reaction is performed in an excess of amine, possibly in the presence of an organic solvent, e.g. a lower aliphatic ketone such as acetone or methylethyl ketone or in the presence of a possibly halogenated aromatic hydrocarbon such as, e.g. benzene, toluene or chlorobenzene.

The following, for example, can be employed as amines of Formula III:

Ammonia, methylamine, ethylamine, propylamine, isopropylamine, n-, sec.- or tert.-butylamine, β-hydroxyethylamine, β-hydroxypropylamine or β,γ-dihydroxypropylamine, dimethylamine, diethylamine, dipropylamine, dibutylamine, di-β-hydroxyethylamine, piperidine or morpholine. Ammonia, dimethyl or diethyl amine are preferred.

The new 1-phenylaminoanthraquinone compounds containing sulphamyl groups are obtained from the reaction mixture either by dilution of the mixture with water or removal of the organic solvent by steam distillation. They can be purified by recrystallisation. In a pure state they are shimmering, crystalline deeply coloured bodies. They dissolve in hot organic solvents in pure violet to blue shades.

Finely distributed in aqueous dispersion in the presence of carriers such as e.g. phenylphenol, they dye fibres containing ester groups at the boil or at temperature of over 100° C. under pressure in very pure violet to blue shades which are fast to light, sublimation and industrial fumes.

By fibres containing ester groups which can be fast-dyed with the dyestuffs according to the invention are meant cellulose triacetate and particularly esters of terephthalic acid and polyvalent alcohols, principally the esters of terephthalic acid with alkylene glycols or with polyhydroxymethylbenzenes such as p-dimethylolbenzene; i.e. the following marketed products: "Terylene" (ICI, Manchester, Great Britain), "Dacron" (Du Pont de Nemours, Wilmington, Del., U.S.A.), "Territal" (Rhodiatoce, Milan, Piazza Erculea 15), "Terlenka" (Aku, Arnhem, Holland), "Tergal" (Rhodiaceta, Lyons, France), "Trevira" (Farbwerke Hoecst, Germany) or "Kodel" (Eastman Chemicals Kodak Inc., Kingsport, Tenn., U.S.A.).

The following examples serve to illustrate the invention. The temperatures are given therein in degrees centigrade. Where not otherwise expressly stated, parts are given as parts by weight. The relationship of parts by weight to parts by volume is as that of grammes to cubic centimetres.

EXAMPLE 1

35.7 parts of 1-(2',4',6'-trimethyl-phenylamino)-4-hydroxyanthraquinone obtained by condensation of 1,4-dihydroxyanthraquinone with 2,4,6-trimethyl-1-aminobenzene in the presence of boric acid and 2-methyl-2,4-pentane diol at 130°, are added within 2 hours at 40° to 300 parts of chlorosulphonic acid and the solution is then stirred for another 4 hours at this temperature. The violet solution is then slowly poured into ice water, the precipitated monosulphonic acid chloride is filtered off, washed with water until the filtrate is neutral and dried in vacuo at 40–50°.

The dry sulphochloride is pulverised and, at room temperature, sprinkled into the solution of 13 parts of dimethylamine in 100 parts of acetone; the reaction which occurs is strongly exothermic. The reaction mixture is then stirred for 15 hours at 55–60°, diluted with 500 parts of water, the suspension is neutralised with hydrochloric acid, cooled to room temperature and the reaction product of the formula

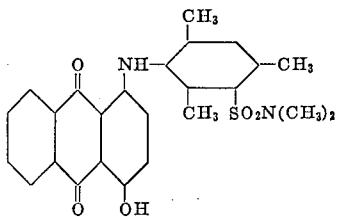

is filtered off and dried in vacuo at 80–100°.

The dyestuff is a brownish violet powder which dissolves in concentrated sulphuric acid with a violet and in organic solvents with a red-violet colour. The finely distributed dyestuff dyes Dacron (Terephthalic acid polyester fibres of E. I. du Pont de Nemours, Wilmington, Delaware, U.S.A.) from an aqueous dispersion in clear, violet fast shades. The dyeings have particularly good fastness to light, washing, sublimation and industrial fumes.

If in the process described above, instead of the dimethylamine, 21.9 parts of diethylamine or 30.3 parts of di-n-propylamine or 38.7 parts of di-n-butylamine are used, then very similar dyestuffs having the same good fastness properties are obtained.

EXAMPLE 2

38.9 parts of the monocondensation product of 2,4,6-trimethyl-1-aminobenzene and 1,4,5,8-tetrahydroxyanthraquinone, obtained by condensing these two substances in the presence of boric acid and 2-methyl-2,4-pentane diol at 130–140°, are dissolved at 40–45° in 250 parts of chlorosulphonic acid. The solution is then stirred for 5 hours at this temperature. The monosulphonic acid chloride formed is precipitated by dropping this solution onto ice. It is filtered off, washed with cold water and dried in vacuo at 40–50°. The substance is added to a solution of 27 parts of dimethylamine in 120 parts of acetone. The reaction mixture is then heated for 18 hours while stirring at 55–60°. The solvent and the greater part of the excess dimethylamine are removed with steam and the condensation product of the formula

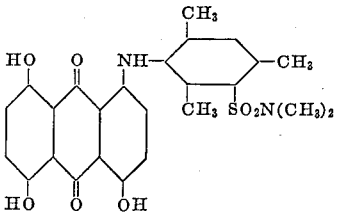

precipitates in solid form as a dark violet-brown powder. It is filtered off and dried. The substance dissolves in concentrated sulphuric acid and in organic solvents with a blue colour.

The finely distributed condensation product dyes polyester fibres from an aqueous suspension in clear, greenish-blue shades which have very good fastness properties.

A somewhat more reddish dyestuff is obtained on using 37.2 parts of 1-(2',4',6'-trimethyl-phenylamino)-4,5-dihydroxyanthraquinone instead of the 38.9 parts of the 1-(2',4',6'-trimethyl-phenylamino)-4,5,8-trihydroxyanthraquinone.

EXAMPLE 3

35.6 parts of 1-(2',4',6'-trimethyl-phenylamino)-4-aminoanthraquinone are added carefully within 2 hours at room temperature to 280 parts of chlorosulphonic acid and the whole is then stirred for 4 hours at 40–45°. The 1-(2',4',6'-trimethyl-phenylamino)-4-aminoanthraquinone is obtained, for example, by condensing 2,4,6-trimethyl-1-aminobenzene and 1-amino-4-bromoanthraquinone-2-sulphonic acid in 40% alcohol at 85° in the presence of sodium bicarbonate and copper chloride and subsequently splitting off the sulphonic acid group in the 2-position under reducing conditions by treatment with glucose in aqueous alkali at 100°.

The monosulphonic acid chloride isolated as in Example 1 by pouring onto ice and filtering off, is added in portions in the moist state while stirring at 40° to a solution of 27 parts of dimethylamine in 90 parts of isopropyl alcohol. The reaction mixture is stirred for another 20 hours at 50–55°. Then the dyestuff of the formula

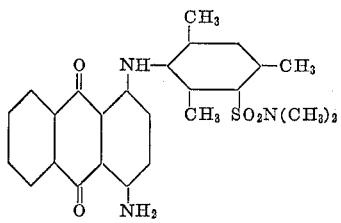

is precipitated from the reaction mixture by diluting it with 250 parts of water, solvent and excess amine are removed by filtration and the product is dried. From an aqueous dispersion the finely distributed dyestuff dyes cellulose triacetate fibres and Dacron (Du Pont de Nemours, Wilmington, Delaware, U.S.A.) or mixtures of these fibres in strongly violettish-blue shades. The dyeings are of great brilliance and have good fastness properties.

A somewhat more greenish dyestuff having similar properties is obtained, if instead of the 35.6 parts of 1-(2',4',6'-trimethyl - phenylamino)-4-amino - anthraquinone, 37 parts of the condensation product of 1-methyl-amino-4-bromo-anthraquinone and 2,4,6-trimethyl-1-aminobenzene are used.

EXAMPLE 4

41.8 parts of 1-(2',4',6'-trimethyl-phenylamino)-4,8-dihydroxy-5-nitroanthraquinone obtained by condensation of 1,5-dinitro-4,8-dihydroxyanthraquinone and 2,4,6-trimethyl-1-aminobenzene at 150–155° are added within 1 hour at room temperature to 300 parts of chlorosulphonic acid and the whole is stirred for 4 hours at 40–45°.

The deep blue solution is then poured while stirring vigorously onto ice, the precipitated sulphochloride is filtered off and washed to give a neutral reaction with cold water. The moist filter cake is then placed in a reaction vessel which contains 11.9 parts of ammonia gas dissolved in 150 parts of acetone and the reaction mixture is stirred at 50–55° until no more starting material can be traced in a sample. The reaction mixture is worked up by steam distillation whereupon the dyestuff of the formula

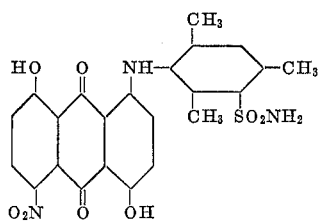

precipitates as a blue-black powder. It is filtered off and dried.

It dissolves in concentrated sulphuric acid and in organic solvents with a blue colour.

Polyester fibres such as Dacron (Du Pont de Nemours, Wilmington, Delaware, U.S.A.) are dyed from an aqueous dispersion of the finely distributed dyestuff in blue shades which are fast to light, sublimation and washing.

A dyestuff similar in every respect is obtained if in the above example, instead of the 1-(2',4',6'-trimethylphenyl-amino)-4,8-dihydroxy-5-nitroanthraquinone, 40.4 parts of 1-(2',6'-dimethyl-phenylamino)-4,8-dihydroxy - 5 - nitro-anthraquinone are used.

EXAMPLE 5

38.8 parts of 1-(2',4',6'-trimethyl-phenylamino)-4,8-dihydroxy-5-amino-anthraquinone, obtained from the starting material of the previous example by reduction with sodium sulphide, are added at room temeprature to 300 parts of chlorosulphonic acid and then the whole is stirred for 5 hours at 40–45°. The solution is then carefully poured onto ice, the precipitated monosulphonic acid chloride is filtered off, washed with cold water and dried in vacuum at 40–50°.

The dry sulphonic acid chloride is then carefully added to a solution of 13.5 parts of dimethylamine in 90 parts of methylethyl ketone. The mixture is stirred for 18 hours at 55–60°. The dyestuff of the formula

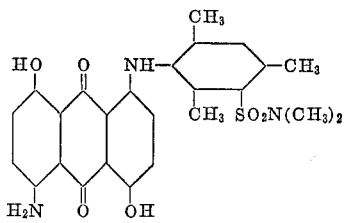

is precipitated by steam distillation, filtered off under suction and dried.

Finely distributed in an aqueous dispersion it dyes the polyester fibre Dacron (Du Pont de Nemours, Wilmington, Delaware, U.S.A.) in clear blue shades. The dyeings have very good fastness to light, washing, sublimation and industrial fumes.

The same dyestuff is obtained if the sulphochloride obtained according to Example 4 is reacted with dimethylamine and then the nitro group is reduced to the amino group with sodium sulphide.

If in the above example, the monosulphonic acid chloride is reacted with 31.5 parts of diethanolamine instead of with dimethylamine, then a very similar dyestuff having equally valuable fastness properties is obtained.

EXAMPLE 6

45.55 parts of the dry monosulphonic acid chloride obtained according to Example 1 is added in small portions with mild cooling to a solution of 34.8 parts of morpholine in 120 parts of acetone. The reaction mixture is heated to 55° within 1 hour and then stirred for 17 hours at this temperature.

The acetone is then distilled off, 200 parts of water are added to the residue and the precipitated reaction product of the formula

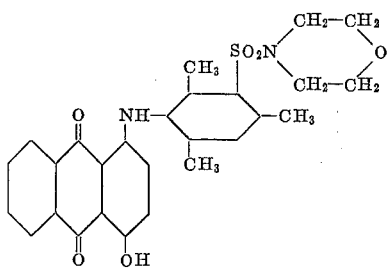

is filtered off, washed with cold water and dried at 100°.

The dyestuff dissolves in concentrated sulphuric acid with a violet and in organic solvents with a red-violet colour. Polyester fibres are dyed from an aqueous dispersion of the finely distributed dyestuff in clear, fast red-violet shades.

EXAMPLE 7

36.35 parts of 1-(2'-methyl-6'-chlorophenylamino)-4-hydroxyanthraquinone, produced by condensation of 1,4-dihydroxyanthraquinone and 2-methyl-6-chloro-1-aminobenzene in the presence of boric acid and 2-methyl-2,4-pentane diol at 130°, are added within 2 hours to 300 parts of chlorosulphonic acid, the addition being made at room temperature with vigorous stirring. The solution is then stirred for 4 hours at 40–45°.

The violet solution is then poured onto ice and the monosulphonic accid chloride which precipitates is filtered off and washed with cold water.

The moist monosulphonic acid chloride is added in portions at 30–40° to a mixture of 8.4 parts of ammonia and 100 parts of acetone and the whole is stirred, until the starting material has disappeared, at 50–60°. The excess ammonia and the acetone are then removed by steam distillation and the precipitated violet-black dyestuff of the formula

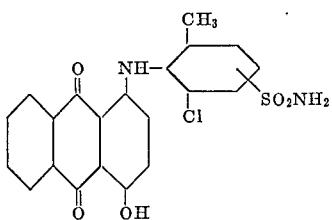

is filtered off and dried. It dissolves in concentrated sulphuric acid with a violet and in organic solvents with a red-violet colour and it dyes polyester fibres from an aqueous dispersion in very fast violet shades.

EXAMPLE 8

37.1 parts of 1-(2',3',5',6'-tetramethyl-phenylamino)-4-hydroxyanthraquinone, obtained by condensation of 1,4-dihydroxy-anthraquinone and 2,3,5,6-tetramethyl-1-aminobenzene in the presence of 2-methyl-2,4-pentanediol and boric acid at 130°, are added in portions, while cooling and within 1 hour, to 320 parts of chlorosulphonic acid. The solution is slowly heated to 40° and then kept for 5 hours at this temperature. It is then poured onto ice whereupon the monosulphonic acid chloride formed precipitates. It is filtered off, washed with water until the washing water is neutral and then dried in vacuo at, most, 50°. The dry monosulphonic acid chloride is then added within 20 minutes at room temperature to a mixture of 18 parts of dimethylamine and 130 parts of methylethyl ketone and the whole is then heated while stirring for 20 hours at 55–60°. The reaction mixture is then diluted with 300 parts of water whereupon the dyestuff of the formula

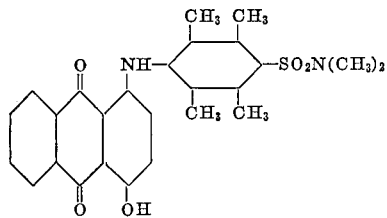

precipitates. The precipitate is a dark violet colour and is filtered off, washed with water and dried. It dissolves in concentrated sulphuric acid with a violet and in organic solvents with an intensive red-violet colour. Polyester fibres such as Dacron (Du Pont de Nemours, Wilmington, Delaware, U.S.A.) are dyed from an aqueous suspension of the finely distributed dyestuff in fast, clear, violet shades.

EXAMPLE 9

56.94 parts of the monosulphonic acid chloride produced according to Example 1 having a moisture content of 20% are sprinkled at 30° into a solution of 26.25 parts of dihydroxyethylamine in 170 parts of acetone. The temperature is raised to 50° and the whole is stirred for 18 hours at 50–60°. The acetone is then distilled off, the residue is diluted with 200 parts of water and the suspension is neutralised with hydrochloric acid. The dyestuff which precipitates of the formula

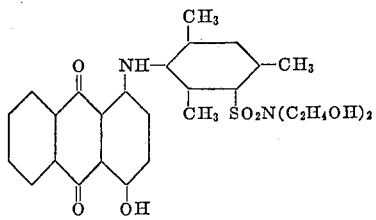

is filtered off, and washed with cold water. After drying it is a black-violet powder which dissolves in concentrated sulphuric acid with a violet and in organic solvents with a red-violet shade. Polyester fibres such as Dacron (Du Pont de Nemours, Wilmington, Delaware, U.S.A.) are dyed from an aqueous dispersion of the finely distributed dyestuff in red-violet shades which are very fast to light and wet.

EXAMPLE 10

37.4 parts of 1-(2',6'-dimethylphenylamino)-4,8-dihydroxy-5-aminoanthraquinone, obtained by condensation of 2,6-dimethyl-1-aminobenzene and 1,5-dinitro-4,8-dihydroxyanthraquinone at 150° and subsequent reduction with sodium sulphide, are carefully added at room temperature to 300 parts of chlorosulphonic acid. The temperature is raised within one hour to 35° and kept at 35–40° for another 7 hours.

The monosulphonic acid chloride is precipitated by carefully pouring the solution onto ice and filtered off. The moist precipitate is added in small portions at room temperature to a solution of 13.5 parts of dimethylamine in 95 parts of acetone whereupon the solution is heated for several hours at 50–60°.

The reaction mixture is distilled to remove the acetone and excess dimethylamine, whereupon the dyestuff of the formula

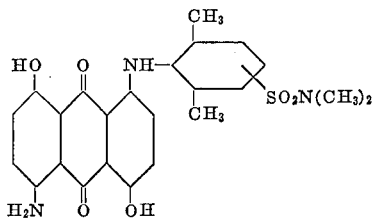

precipitates. It is filtered off, washed and dried. It is a dark violet powder which dissolves in concentrated sulphuric acid and in organic solvents with a blue colour. The polyester fibre Dacron (Du Pont de Nemours, Wilmington, Delaware, U.S.A.) is dyed from an aqueous dispersion of the finely distributed dyestuff in very clear blue shades. The dyeings are very fast to light, washing and sublimation.

A slightly more greenish dyestuff having the same good fastness properties is obtained if, in the above example, 37.4 parts of 1-(2',6'-dimethylphenylamino)-4,5-dihydroxy-8-aminoanthraquinone are used instead of the 1-(2',6' - dimethylphenylamino)-4,8-dihydroxy - 5 - aminoanthraquinone.

EXAMPLE 11

37.5 parts of 1-(2',6'-dimethoxyphenylamino)-4-hydroxyanthraquinone, obtained by condensation of 1,4-dihydroxyanthraquinone and 2,6-dimethoxy-1-aminobenzene in the presence of boric acid and 1,3-propane diol at 130°, are added to 250 parts of chlorosulphonic acid at room temperature and the whole is heated for another 5 hours at 40–45°. The sulphochloride formed is isolated in the usual way, dried in vacuo at 40° and added to a solution of 22.5 parts of dimethylamine in 70 parts of isopropanol. The whole is stirred for 17 hours at 55–

60°, the mixture is then diluted with 250 parts of water whereupon the dyestuff of the formula

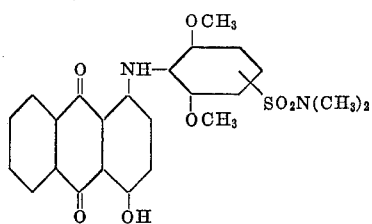

is obtained. It dissolves in concentrated sulphuric acid with a greenish blue and in organic solvents with a blue violet colour.

It dyes polyester fibres in blue-violet shades which have good fastness properties.

The following table gives further dyestuffs which are produced according to Examples 1–11 together with the shade of the dyeings of Dacron (Du Pont de Nemours, Wilmington, Delaware, U.S.A.).

Table

| | | Shade on Dacron |
|---|---|---|
| 1 | anthraquinone with NH-cyclohexyl(CH$_3$)$_2$-SO$_2$N(CH$_3$)$_2$, OH | Violet. |
| 2 | anthraquinone with NH-cyclohexyl(CH$_3$)(Cl)-SO$_2$N(CH$_3$)$_2$, OH | Do. |
| 3 | anthraquinone with NH-cyclohexyl(C$_2$H$_5$)$_2$-SO$_2$NH$_2$, OH | Do. |
| 4 | anthraquinone with NH-cyclohexyl(CH$_3$)$_3$-SO$_2$NHC$_2$H$_4$OH, OH | Do. |
| 5 | dichloro-anthraquinone with NH-cyclohexyl(CH$_3$)$_2$-SO$_2$N(CH$_3$)$_2$, OH | Do. |
| 6 | chloro-anthraquinone with NH-cyclohexyl(CH$_3$)$_2$-SO$_2$N(CH$_3$)$_2$, OH | Do. |

Table—Continued
| | Shade on Dacron |
|---|---|
| 7...... 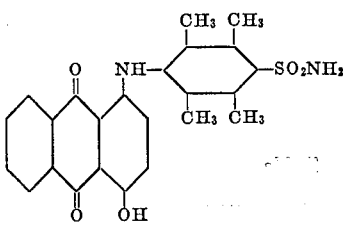 | Violet. |
| 8...... 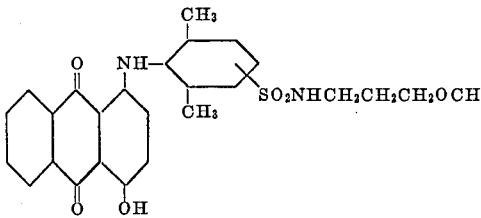 | Do. |
| 9...... 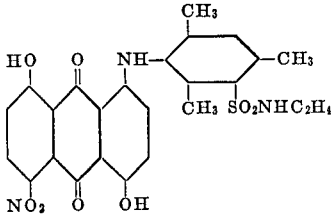 | Blue. |
| 10..... 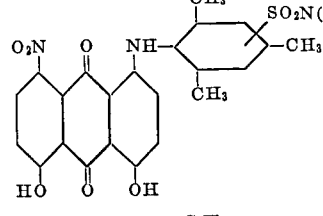 | Do. |
| 11..... 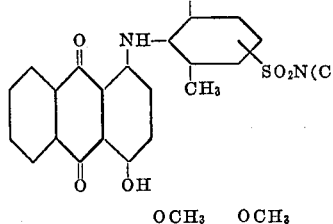 | Violet. |
| 12..... 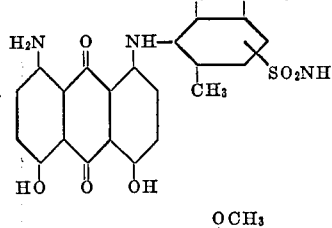 | Blue. |
| 13..... 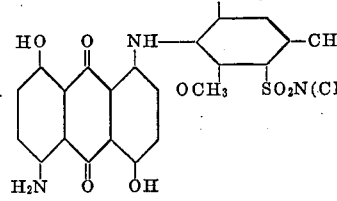 | Do. |

Table—Continued
| | | Shade on Dacron |
|---|---|---|
| 14 | 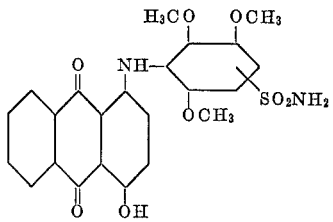 | Violet. |
| 15 | 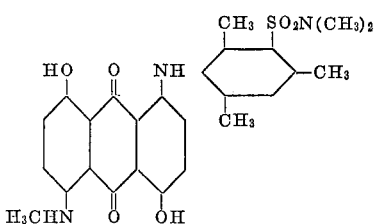 | Blue. |
| 16 | 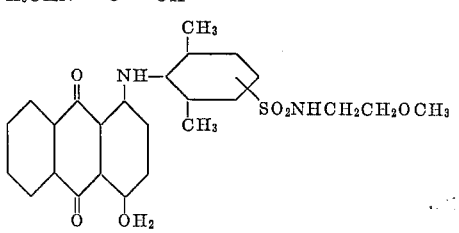 | Do. |
| 17 | 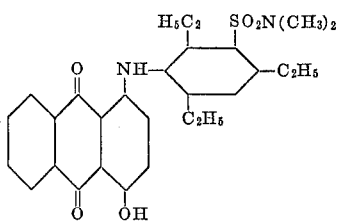 | Violet. |
| 18 | 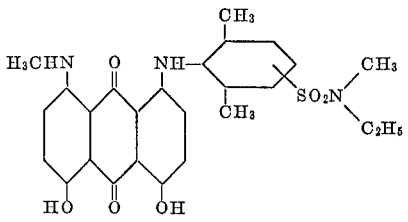 | Blue. |
| 19 | 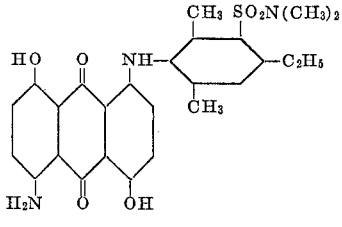 | Do. |
| 20 | 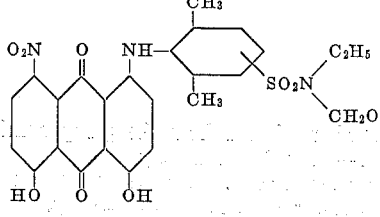 | Do. |

Table—Continued

| | Shade on Dacron |
|---|---|
| 21 (anthraquinone structure with NH-phenyl(CH3)2-SO2N(CH3)(C2H5), OH) | Violet. |
| 22 (anthraquinone structure with NH-phenyl(CH3)3-SO2N(CH3)(C2H4OH), OH) | Do. |
| 23 (anthraquinone structure with NH-phenyl(CH3)3-SO2N(morpholine/piperidine), OH) | Do. |
| 24 (diamino anthraquinone structure with NH-phenyl(CH3)2-SO2N(CH3)2, OH, OH) | Blue. |
| 25 (anthraquinone structure with NH-phenyl(CH(CH3)2)2-SO2N(CH3)2, OH) | Violet. |
| 26 (anthraquinone structure with NH-phenyl(CH3)(CH(CH3)2)-SO2N(CH3)2, OH, H2N) | Blue. |

We claim:
1. An anthraquinone dyestuff of the formula

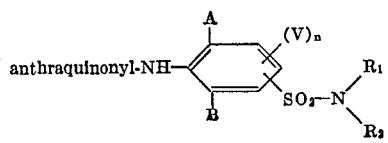

wherein
A is a member selected from the group consisting of lower alkyl and lower alkoxy,
B is a member selected from the group consisting of halogen, lower alkyl and lower alkoxy,
each of $R_1$ and $R_2$, taken independently of each other, is a member selected from the group consisting of hydrogen, lower alkyl, lower hydroxyalkyl, and lower alkoxyalkyl, $R_1$ and $R_2$, taken together with the nitrogen atom to which both are bonded, is a member selected from the group consisting of piperidino and morpholino, V is a member selected from the group consisting of lower alkyl and lower alkoxy, $n$ is an integer from 0 to 2, inclusive, and anthraquinonyl- is a member selected from the group consisting of a radical of the formula

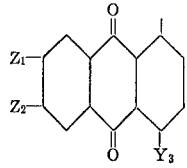

a radical of the formula

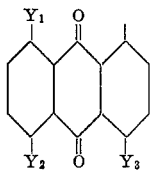

a radical of the formula

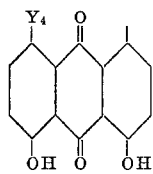

and a radical of the formula

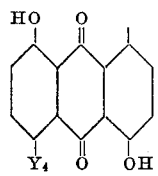

each of $Y_1$ and $Y_2$ is a member selected from the group consisting of hydrogen and hydroxy, and one of $Z_1$ and $Z_2$ is halogen and the other is a member selected from the group consisting of hydrogen and halogen;

$Y_3$ is a member selected from the group consisting of hydroxy, amino and monomethylamino, and $Y_4$ is a member selected from the group consisting of amino, monomethylamino and nitro.

2. The anthraquinone dyestuff of the formula

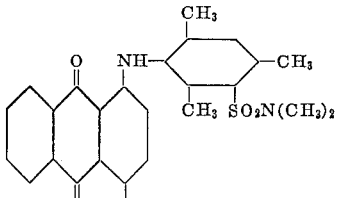

3. The anthraquinone dyestuff of the formula

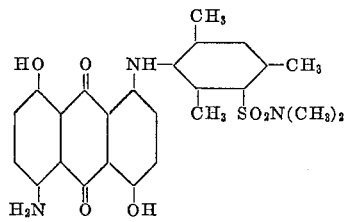

4. The anthraquinone dyestuff of the formula

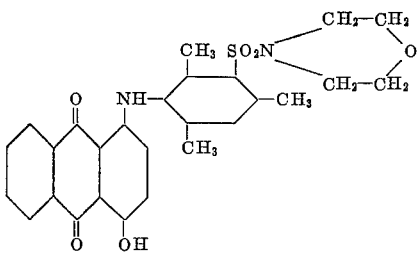

5. The anthraquinone dyestuff of the formula

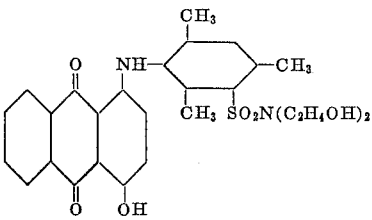

6. The anthraquinone dyestuff of the formula

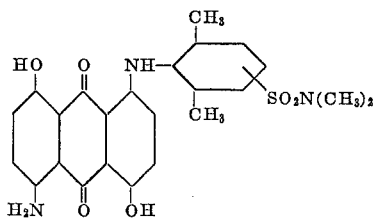

No references cited.

ALEX MAZEL, *Primary Examiner.*

JOSE TOVAR, *Assistant Examiner.*